United States Patent

Schmitt

(10) Patent No.: US 9,604,515 B2
(45) Date of Patent: Mar. 28, 2017

(54) SPRING FOR A MOTOR VEHICLE

(71) Applicant: Audi AG, Ingolstadt (DE)

(72) Inventor: Joachim Schmitt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 94 days.

(21) Appl. No.: 13/955,910

(22) Filed: Jul. 31, 2013

(65) Prior Publication Data

US 2014/0046502 A1 Feb. 13, 2014

(30) Foreign Application Priority Data

Aug. 7, 2012 (DE) .................. 10 2012 015 644

(51) Int. Cl.
*B60G 11/00* (2006.01)
*B60G 11/14* (2006.01)
*B60G 17/019* (2006.01)
*F16F 1/36* (2006.01)
*F16F 1/366* (2006.01)

(52) U.S. Cl.
CPC .............. *B60G 11/00* (2013.01); *B60G 11/14* (2013.01); *B60G 17/019* (2013.01); *F16F 1/366* (2013.01); *F16F 1/3615* (2013.01); *F16F 1/3665* (2013.01); *B60G 2202/12* (2013.01); *B60G 2400/252* (2013.01); *B60G 2401/00* (2013.01)

(58) Field of Classification Search
CPC ...... B60G 2401/00; B60G 2401/12–2401/122; B60G 11/00–11/64; B60G 17/019; B60G 2202/12; B60G 2400/252; F16F 1/366; F16F 1/3615; F16F 1/3665
USPC ............................................................ 701/1
See application file for complete search history.

(56) References Cited

U.S. PATENT DOCUMENTS

| 4,411,159 A * | 10/1983 | Spear .................... G01L 1/2206 177/211 |
| 7,311,124 B2 | 12/2007 | Sardou |
| 2006/0283242 A1 * | 12/2006 | Kunow .................... G01B 5/30 73/161 |
| 2009/0243174 A1 | 10/2009 | Spencer et al. |

OTHER PUBLICATIONS

Lee et al., KR Pub. No. 1020120056506 (Jun. 4, 2012) (Machine Translation).*

* cited by examiner

*Primary Examiner* — Courtney Heinle
(74) *Attorney, Agent, or Firm* — Henry M. Feiereisen LLC.

(57) ABSTRACT

A spring made of a fiber composite includes a metal thread which is connected to the spring and has an electrical resistance which changes in dependence on a deformation of the spring. The metal thread can be integrated inside the spring or may also be arranged on an outer side of the spring.

16 Claims, 2 Drawing Sheets

SPRING FOR A MOTOR VEHICLE

CROSS-REFERENCES TO RELATED APPLICATIONS

This application claims the priority of German Patent Application, Ser. No. 10 2012 015 644.8, filed Aug. 7, 2012, pursuant to 35 U.S.C. 119(a)-(d), the content of which is incorporated herein by reference in its entirety as if fully set forth herein.

BACKGROUND OF THE INVENTION

The present invention relates to a spring, and more particularly to a load-bearing spring for a motor vehicle.

The following discussion of related art is provided to assist the reader in understanding the advantages of the invention, and is not to be construed as an admission that this related art is prior art to this invention.

Springs find application in many fields, e.g. as load-bearing spring used for a motor vehicle and associated to a shock absorber or forming part thereof. With such a shock absorber with load-bearing spring, individual wheels of the vehicle are supported by the vehicle body. For this use, the spring is normally implemented as helical spring with cylindrical base configuration. In addition, springs have been known of different geometric configuration, e.g. spiral springs, leaf spring, disk springs etc. Such springs also find wide application. The task of such springs is to absorb and to reduce or store forces. When exposed to a force, the spring deforms and undergoes a change in geometry.

Springs permit a relative movement between two dynamically coupled components and provide an energy store. Some applications, for example in a motor vehicle, involve a control of driver assist or regulating systems which impact the operation of the motor vehicle and may involve an electronic stability program (ESP), anti-lock braking system (ABS), automatic damping system etc. For such applications, it would be useful to have information about actual force conditions in the area of the spring for example or also about other areas of interest.

It would therefore be desirable and advantageous to provide an improved spring to obviate prior art shortcomings and to enable determination of information especially about actual force conditions in the area of the spring.

SUMMARY OF THE INVENTION

According to one aspect of the present invention, a spring made of a fiber composite includes a metal thread connected to the spring and having an electrical resistance which changes in dependence on a deformation of the spring.

The present invention resolves prior art problems by providing a spring of fiber composite with at least one metal thread which is firmly connected to the spring and configured to follow any deformation of the spring as a result of a change in geometry caused by forces exerted on the spring. As the metal thread tracks the change in geometry of the spring, the electric resistance of the metal thread changes. This electric resistance can now be easily detected using a suitable control device that is operably connected to the metal thread. The measured actual resistance correlates with a respective deformation of the spring which in turn correlates necessarily with defined force conditions. By integrating the spring according to the invention in the form of four load-bearing springs in a motor vehicle, a defined initial state can be established, when the vehicle is in idle state and not subject to a load. This idle state can be used for example as reference state. Any stress on the vehicle, e.g. by weight or load change during operation, causes a respective change in geometry of the metal threads, thereby causing defined changes in resistance. By determining the respective resistance, a precise correlation can be established in relation to the introduced force, i.e. the spring force or wheel contact force can be directly ascertained.

Depending on the application of the spring according to the invention in the motor vehicle, this information can now be used to control respective driver assist or regulating systems such as electronic stability program, anti-lock braking system or damping control for influencing the chassis. In addition, determination of the wheel contact force may also be used to utilize maximum adhesion potential of the tires on the road surface.

As metal thread, any type of thread may be used which has a defined, advantageously linear resistance profile in dependence on a deformation of the spring. Presence of a linear resistance profile is preferred, although not required of course. It is sufficient, when basically a defined correlation between resistance and thread geometry is known and can be stored in the control device.

For applications in motor vehicles, there is basically the possibility to store resistance-force characteristic diagrams with respect to different temperatures, for example staggered in intervals. The electric resistance is a function of the temperature. In order to be able to still correctly determine the respective force condition also under extreme situations of great temperature fluctuations, as encountered during operation of a motor vehicle between temperatures of up to −40° and temperatures of up to +40°, the provision of a temperature-staggered presence of characteristic diagrams is useful. The given temperature can easily be ascertained by equipping the motor vehicle with a temperature sensor which measures the outside temperature so that the control device can then select the respective, temperature-related characteristic diagram and determine the respective forces in combination with the resistance measurement.

Although it is generally sufficient to provide the spring with only a single metal thread, it may be appropriate in some instances to provide several metal threads whose change in resistance can be determined separately. As a result, there is the possibility to obtain redundant resistance values so as to ensure the measurement of at least one resistance value when, for whatever reasons, a metal thread fails. Moreover, determination of several resistance values allows a check of plausibility of a leading resistance value through comparison with the other resistance values and when affirming the plausibility to use the leading resistance value as basis for the further control/regulation.

The metal thread may be arranged in various geometric ways. For example, the metal thread can be integrated inside the spring. It is also conceivable to arrange the metal thread on an outer side of the spring, optionally underneath a respective protective paint or the like. A metal thread may, for example, extend longitudinally along the spring, i.e. in parallel relationship to the inner core and embedded in the fiber composite, e.g. a resin-fiber-matrix. This is possible, when the matrix forms the desired shape by winding resin-impregnated fiber fabric or the like about the core which is elongated in initial state, and subsequent compression molding. As an alternative, it is also conceivable to wind the metal thread(s) helically about the inner core.

According to another advantageous feature of the present invention, the metal thread has ends which can be guided outwards from the fiber composite (resin-fiber-matrix) for allowing contacting. Advantageously, the ends of the metal thread can be guided outwards from ends of the spring to realize a greatest possible length of the integrated metal thread. The thread ends may have appropriate terminals for contact and connection to the control device.

According to another advantageous feature of the present invention, the fiber composite can be made of GFRP (glass fiber reinforced plastic) or CFRP (carbon fiber reinforced plastic). The fiber composite may, of course, also be made of any other suitable material.

The spring may be configured in any suitable shape or form. For example, the spring may be constructed in the form of a helical spring, spiral spring, leaf spring, disk spring, or torsion bar spring. Of course, other spring types are conceivable as well.

According to another aspect of the present invention, a motor vehicle includes a vehicle wheel, and a damping device having a spring made of a fiber composite and including a metal thread which is connected to the spring and has an electrical resistance which changes in dependence on a deformation of the spring.

According to another advantageous feature of the present invention, a control device can be provided and configured to determine a force value, commensurate with a spring force or a wheel contact force, in response to an ascertained resistance value, and to control at least one operating system of the motor vehicle as a function of the determined force value. As described above, any type of driver assist or regulating system of the vehicle may be involved hereby.

According to another advantageous feature of the present invention, the control device can be configured to determine a plausibility of the ascertained resistance value as a function of further resistance values, as ascertained on a spring. This assumes that each individual spring has at least two metal threads which deliver separate geometry-dependent resistance values.

According to another advantageous feature of the present invention, the control device can be configured to separately ascertain resistance values of a plurality of metal threads of the spring, and to determine an averaged or weighted force value as a function of all ascertained resistance values.

According to another advantageous feature of the present invention, the control device can be configured to store plural characteristic diagrams associated to defined temperatures or temperature intervals and relating to a geometry-dependent resistance profile of the metal thread, and to select a temperature-associated one of the characteristic diagrams in dependence on an ascertained room temperature. The thus-selected characteristic diagram can subsequently be used as basis for the force value determination. The temperature dependence of the resistance profile, although preferably slight, can also be taken into account for the force value determination.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
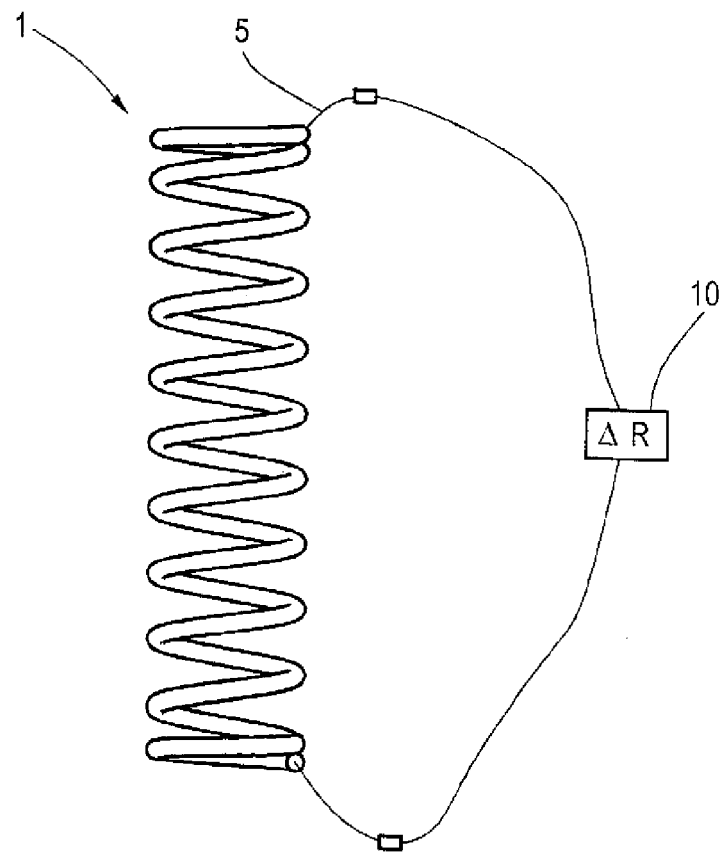
FIG. 1 is a basic illustration of a spring according to the present invention in the form of a helical spring useful as load-bearing spring for a motor vehicle.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
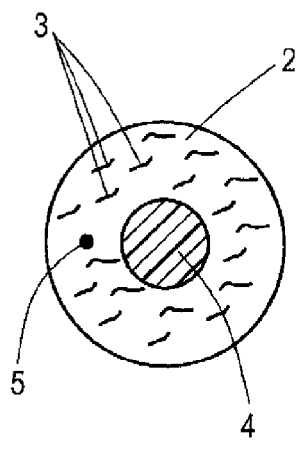
FIG. 2 is a sectional view of one embodiment of a spring with metal thread.
Figure 3:
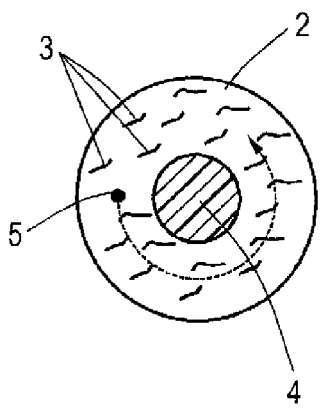
FIG. 3 is a sectional view of another embodiment of a spring with metal thread.

Turning now to the drawing, and in particular to FIG. 1, there is shown a basic illustration of a spring according to the present invention, generally designated by reference numeral 1 and configured in the form of a helical spring useful as load-bearing spring for a motor vehicle. The spring 1 is made of fiber composite. By way of example, FIGS. 2 and 3 show two embodiments of the spring 1 of fiber composite, comprised of a cured matrix 2 which is made of resin or the like, in which a plurality of individual threads 3, for example glass fibers or carbon fibers, are dispersed. Even though FIGS. 2 and 3 show a random arrangement of the fibers 3, it is, of course, also conceivable, to integrate the fibers in the form of a woven or non-woven fabric, i.e. with aligned fibers. FIGS. 2 and 3 thus show merely basic illustrations by way of example.

As shown in FIGS. 2 and 3, the spring 1 has an inner core 4 which is made, for example, of elastic material. The provision of such a core 4 is, however, not necessarily required. Arranged about the core 4 is the resin matrix 2 and the fibers 3 to stiffen the entire spring 1 and to predominantly define the spring characteristics.

As shown in FIGS. 1-3, a metal thread 5 is integrated in the spring 1 and, as shown in FIG. 1, is guided outwards at the ends of the spring 1 and connected at respective contact points to a control device 10 via a line connection. The metal thread 5 is made of a material which has a greatest possible change in resistance in response to a change in geometry of the metal thread 5, caused by a change in geometry of the spring 1. The metal thread 5 is embedded firmly and immobile in the resin matrix 2 so as to precisely track even a slightest spring movement or change in geometry of the spring 1. As a result, the metal thread 5 is also caused to undergo a geometric change. This, in turn, results in a change of the electric resistance of the metal thread 5. The change of the electric resistance may hereby be slight. The control device 10 measures the electric resistance by applying a small measuring current so that the measured resistance value can be used to determine the momentary force which correlates to the change in geometry of the spring and thus to the change in resistance. Knowledge of this force value can then be used for control or regulation of subsystems, as will be described with reference to FIG. 4.

As shown in FIG. 2, the metal thread 5 is integrated in the spring 1 to run virtually longitudinally along and in parallel relation to the inner core 4. The metal thread 5 thus extends along the length of the spring 1, i.e. the length of the metal thread 5 roughly corresponds to the length of the spring 1. Such a course of the metal thread 5 can, for example, be building up the matrix 2 and the fibers 3 for example via resin-impregnated fiber fabrics and winding thereof about the core 4. The metal thread 5 can be placed between two such layers. Subsequently, the longitudinal winding is transformed into the desired spring shape and the matrix 2 is cured.

FIG. 3 shows an example in which the metal thread 5 is wound helically about the inner core 4, i.e. the metal thread 5 winds like a double helix about the core 4 but also about the central spring axis according to the helical shape of the spring 1. The dotted line indicates a winding of the metal thread 5 about the core 4. Such a guidance of the metal thread 5 becomes possible for example by winding the matrix 2 including the fibers 3 about the inner core 4 via rotating fiber drums from which the fibers are payed out. The metal thread 5 can be fed via such a drum so as to incorporate a multilayered wound fiber structure.

Any curable matrix may be used as matrix 2, advantageously on polymer basis such as, for example, epoxy resin or the like. Any metal thread that changes its resistance geometry-dependent in a defined manner may be used as metal thread 5.

Figure 4:
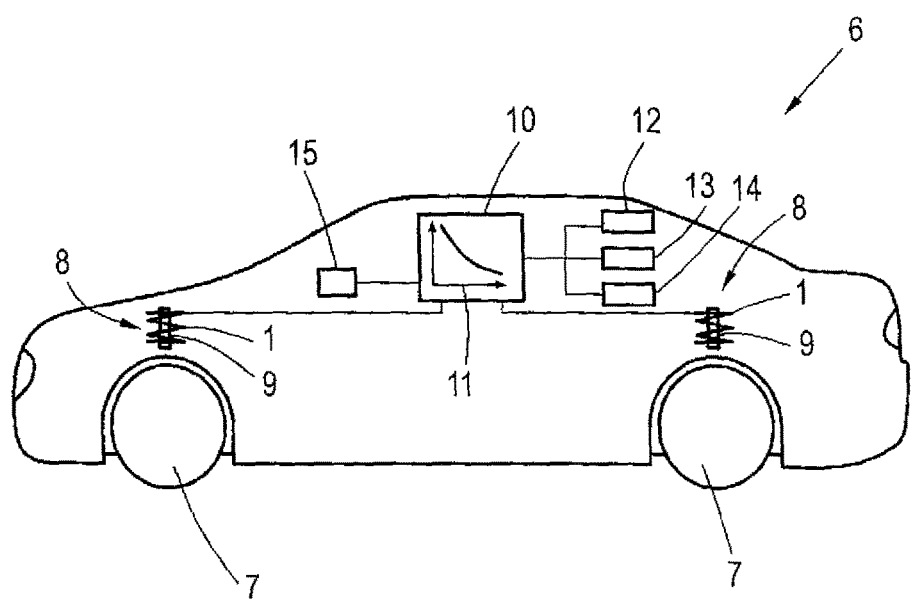
FIG. 4 is a simplified, schematic illustration of a motor vehicle according to the present invention.

Referring now to FIG. 4, there is shown a simplified, schematic illustration of a motor vehicle according to the present invention, generally designated by reference numeral 6. The motor vehicle 6 has four wheels 7 of which only two are shown in FIG. 4. Each wheel 7 is operably connected to a damping device 8 which includes a shock absorber 9 and a spring 1 according to the present invention. Each spring 1 has at least one metal thread 5. Each metal thread 5 is connected via respective lines with the control device 10 which is capable to ascertain the electric resistance of each individual metal thread 5. As shown by the basic illustration of FIG. 4, the control device 10 stores one or more characteristic curves 11 which indicate the resistance profile and the associated force applied on the respective spring 1. The respective characteristic curve forms the basis from which the actual force values such as spring force or wheel contact force can be computed, as will be described hereinafter. These force values can be fed to the control or regulation of further associated driver assist systems 12 (e.g. ESP system), 13 (e.g. ABS system), or 14 (e.g. automatic damping control).

As further shown in FIG. 4, the motor vehicle 6 is equipped with a temperature sensor 15 which provides information about the ambient or room temperature in the area of the springs 1, i.e. measures ultimately the outside temperature. Several temperature-specific characteristic diagrams can be stored in the control device 10 and are associated to defined temperatures or defined temperature intervals. On the basis of determined actual ambient temperature, the control device 10 selects the associated characteristic curve which then forms the basis for the subsequent control.

Even though FIGS. 1-3 show springs having a single metal thread 5, it is, of course, conceivable to provide the spring 1 with two or more separate metal threads 5. Each individual metal thread 5 thus changes its resistance as the spring undergoes a change in geometry. The control device 10 is able to determine the change in resistance of each of the metal threads 5. The individual resistance values may be analyzed for plausibility purposes or may be averaged.

As described above with reference to the exemplary embodiment of FIG. 4, the respective force values are determined on the basis of characteristic curves. This represents only one option. It is also conceivable to determine the force values through computation according to the following relationship:

$$R = \rho \frac{1}{A} = \rho \frac{4 \cdot 1}{D^2 \cdot \pi}$$

wherein:
ρ: specific resistance
l: is wire length
A: cross sectional area
D: diameter of wire The change in resistance at stress is generally:

$$\Delta R = \frac{\delta R}{\delta \rho} \cdot \Delta \rho + \frac{\delta R}{\delta 1} \cdot \Delta 1 + \frac{\delta R}{\delta d} \cdot \Delta d$$

Through differentiation and transformation, the relative change in resistance can be computed by the following relationship:

$$\frac{\Delta R}{R} = \frac{\Delta \rho}{\rho} + \frac{\Delta 1}{1} - \frac{2 \cdot \Delta d}{d}$$

The relative change in resistance is dependent on the length and transverse elongation:

$$\varepsilon = \frac{\Delta 1}{1}$$

and $$\varepsilon_\rho = \frac{\Delta d}{d} = -\mu \cdot \varepsilon.$$

As a result, it follows:

$$\frac{\Delta R}{R} = k \cdot \frac{\Delta 1}{1} = k \cdot \varepsilon$$

wherein κ represents the so-called k-factor:

$$k = \frac{\Delta \rho}{\rho \cdot \varepsilon} + 1 + 2 \cdot \mu$$

wherein:
ε: relative change in length
$\varepsilon_\rho$: relative change in cross section
μ: transverse strain
k: k factor.

The spring force is determined for a helical spring with metal thread 5 in the outermost layer according to the relationship:

$$F = \frac{\pi d^3 \cdot \varepsilon \cdot G}{8Dm}$$

wherein:
F: force
D: diameter of the thread
ϵ: elongation
G: shear modulus
$D_m$: mean diameter of the helical spring cylinder.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A spring for a motor vehicle, comprising a fiber composite matrix extending in a direction of elongation, and a metal thread having an electrical resistance which changes in dependence on a deformation of the spring, wherein the metal thread is encased inside the fiber composite matrix, extends uninterruptedly inside the fiber composite matrix in the direction of elongation of the fiber composite matrix along said direction over its whole length and has opposite ends guided from inside of the fiber composite matrix outwards of both opposite ends of the fiber composite matrix to measure the electrical resistance of the metal thread continuously over the whole length of the spring.

2. The spring of claim 1, constructed as a load-bearing spring.

3. The spring of claim 1, further comprising a plurality of said metal thread configured to enable separate determination of their change in resistance.

4. The spring of claim 1, wherein the fiber composite is composed of GFRP (glass fiber reinforced plastic) or CFRP (carbon fiber reinforced plastic).

5. The spring of claim 1, constructed in the form of a helical spring, spiral spring, leaf spring, disk spring, or torsion bar spring.

6. The spring of claim 1, wherein the metal thread is embedded immovably in the fiber composite matrix so as to track a slightest spring movement or change in geometry of the spring.

7. The spring of claim 1, wherein the fiber composite matrix has an inner core, and the metal thread is wound helically about the inner core.

8. The spring of claim 1, wherein the fiber composite matrix has an inner core extending in the direction of elongation of the fiber composite matrix, and the metal thread extends along the inner core in the direction of elongation of the fiber composite matrix.

9. A motor vehicle, comprising:
a vehicle wheel;
a damping device having a spring made of a fiber composite matrix extending in a direction of elongation and a metal thread having an electrical resistance which changes in dependence on a deformation of the spring, wherein said metal thread is encased inside the fiber composite matrix, extends uninterruptedly inside the fiber composite matrix in the direction of elongation of the fiber composite matrix along said direction over its whole length and has opposite ends guided from inside of the fiber composite matrix outwards of both opposite ends of the fiber composite matrix to measure the electrical resistance of the metal thread continuously over the whole length of the spring.

10. The motor vehicle of claim 9, wherein the fiber composite is composed of GFRP (glass fiber reinforced plastic) or CFRP (carbon fiber reinforced plastic).

11. The motor vehicle of claim 9, wherein the spring is a helical spring, spiral spring, leaf spring, disk spring, or torsion bar spring.

12. The motor vehicle of claim 9, constructed as a load-bearing spring.

13. The motor vehicle of claim 9, further comprising a plurality of said metal threads extending in the direction of elongation of the fiber composite matrix along said direction and configured to enable separate determination of their change of resistance.

14. The motor vehicle of claim 9, wherein the metal thread is embedded immovably in the fiber composite matrix so as to track a slightest spring movement or change in geometry of the spring.

15. The motor vehicle of claim 9, wherein the fiber composite matrix has an inner core, and the metal thread is wound helically about the inner core.

16. The motor vehicle of claim 9, wherein the fiber composite matrix has an inner core extending in the direction of elongation of the fiber composite matrix, and the metal thread extends along the inner core in the direction of elongation of the fiber composite matrix.

* * * * *